(12) United States Patent
Rivlin et al.

(10) Patent No.: US 10,318,962 B2
(45) Date of Patent: Jun. 11, 2019

(54) AUTHENTICITY LABEL FOR ITEMS

(71) Applicant: Amazon Technologies, Inc., Seattle, WA (US)

(72) Inventors: Yair Rivlin, Seattle, WA (US); Samuel Pike Hall, VI, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1058 days.

(21) Appl. No.: 14/543,267

(22) Filed: Nov. 17, 2014

(65) Prior Publication Data
US 2016/0140569 A1    May 19, 2016

(51) Int. Cl.
*G06Q 30/00* (2012.01)
*C09J 7/20* (2018.01)
*G09F 3/02* (2006.01)

(52) U.S. Cl.
CPC ............ *G06Q 30/018* (2013.01); *C09J 7/203* (2018.01); *C09J 2201/122* (2013.01); *C09J 2203/338* (2013.01); *G09F 2003/022* (2013.01); *G09F 2003/023* (2013.01); *G09F 2003/0213* (2013.01); *G09F 2003/0257* (2013.01); *G09F 2003/0277* (2013.01)

(58) Field of Classification Search
None
See application file for complete search history.

(56) References Cited

U.S. PATENT DOCUMENTS

| | | | |
|---|---|---|---|
| 3,973,788 A | 8/1976 | Pekko et al. | |
| 4,268,983 A | 5/1981 | Cook | |
| 4,278,199 A | 7/1981 | Tanaka | |
| 4,551,373 A | 11/1985 | Conlon | |
| 4,558,318 A | 12/1985 | Katz et al. | |
| 4,637,635 A | 1/1987 | Levine | |
| 4,781,378 A | 11/1988 | Clinnin et al. | |
| 4,936,606 A | 6/1990 | Moss | |
| 5,042,842 A | 8/1991 | Green et al. | |
| 5,238,272 A | 8/1993 | Taylor | |
| 5,271,642 A | 12/1993 | Jahier et al. | |
| 5,340,158 A | 8/1994 | Bartl | |
| 5,346,259 A | 9/1994 | Mocilnikar et al. | |

(Continued)

FOREIGN PATENT DOCUMENTS

| | | |
|---|---|---|
| GB | 2383776 | 7/2003 |
| GB | 2478149 | 8/2011 |
| WO | 0023954 | 4/2000 |

OTHER PUBLICATIONS

U.S. Appl. No. 14/543,285 entitled "Tracking and Verifying Authenticity of Items" and filed Nov. 17, 2014.

(Continued)

*Primary Examiner* — Frank D Ducheneaux
(74) *Attorney, Agent, or Firm* — Thomas | Horstemeyer, LLP

(57) ABSTRACT

Disclosed are various embodiments of multi-layer identifier labels. In one embodiment, a multi-layer identifier label includes an upper layer bearing a public identifier, a lower layer bearing a private identifier, and an adhesive backing below the lower layer. The upper layer may be removably attached to the lower layer, and the lower layer may be non-visible underneath the upper layer. Peeling away the upper layer to reveal the lower layer may be a tamper-evident action.

20 Claims, 9 Drawing Sheets

(56) References Cited

U.S. PATENT DOCUMENTS

| | | |
|---|---|---|
| 5,380,047 A | 1/1995 | Molee et al. |
| 5,413,384 A | 5/1995 | Principe et al. |
| 5,439,721 A | 8/1995 | Pedroli et al. |
| 5,551,729 A | 9/1996 | Morgan |
| 5,582,434 A | 12/1996 | Skov et al. |
| 5,660,925 A | 8/1997 | Cooley et al. |
| 5,766,716 A | 6/1998 | Barry |
| 5,770,283 A | 6/1998 | Gosselin et al. |
| 5,793,030 A | 8/1998 | Kelly, Jr. |
| 5,869,160 A | 2/1999 | Mason et al. |
| 6,069,955 A | 5/2000 | Coppersmith et al. |
| 6,149,204 A | 11/2000 | Casper |
| 6,231,082 B1 | 5/2001 | Van Boom et al. |
| 6,428,867 B1 | 8/2002 | Scott et al. |
| 6,547,137 B1 | 4/2003 | Begelfer et al. |
| 7,179,393 B2 | 2/2007 | Isherwood et al. |
| 7,852,195 B2 | 12/2010 | Costa et al. |
| 7,930,868 B1 | 4/2011 | Weber |
| 8,108,309 B2 | 1/2012 | Tan |
| 9,892,662 B2 | 2/2018 | Turner et al. |
| 2002/0026575 A1 | 2/2002 | Wheeler et al. |
| 2004/0020086 A1 | 2/2004 | Hudson |
| 2004/0209028 A1 | 10/2004 | Gosselin |
| 2005/0114270 A1 | 5/2005 | Hind et al. |
| 2005/0153113 A1 | 7/2005 | Hseih et al. |
| 2005/0167044 A1 | 8/2005 | Exeter et al. |
| 2005/0218209 A1 | 10/2005 | Heilper et al. |
| 2005/0230960 A1 | 10/2005 | Bilodeau et al. |
| 2005/0236113 A1 | 10/2005 | Tani et al. |
| 2006/0182955 A1 | 8/2006 | Sellars |
| 2006/0249951 A1 | 11/2006 | Cruikshank et al. |
| 2007/0179978 A1 | 8/2007 | Lee et al. |
| 2008/0120710 A1 | 5/2008 | Holz et al. |
| 2008/0140432 A1 | 6/2008 | Fenn |
| 2009/0061222 A1 | 3/2009 | Grobe |
| 2009/0100271 A1 | 4/2009 | Harris |
| 2009/0169019 A1 | 7/2009 | Bauchot et al. |
| 2009/0283583 A1 | 11/2009 | Cowburn et al. |
| 2009/0327008 A1 | 12/2009 | Collins et al. |
| 2010/0025476 A1 | 2/2010 | Widzinski, Jr. et al. |
| 2010/0324920 A1 | 12/2010 | Sullivan et al. |
| 2011/0019283 A1 | 1/2011 | Steenblik et al. |
| 2011/0093113 A1 | 4/2011 | Sager et al. |
| 2011/0167010 A1 | 7/2011 | Soppera et al. |
| 2011/0231316 A1 | 9/2011 | Carroll |
| 2011/0276502 A1 | 11/2011 | Dameri |
| 2012/0041887 A1 | 2/2012 | Hurme et al. |
| 2012/0130868 A1 | 5/2012 | Loken |
| 2012/0175412 A1 | 7/2012 | Grabiner et al. |
| 2012/0254052 A1 | 10/2012 | Gao et al. |
| 2013/0134698 A1 | 5/2013 | Mayrhofer et al. |
| 2013/0161938 A1* | 6/2013 | Mayrhofer ............ G09F 3/0292 283/81 |
| 2013/0175335 A1* | 7/2013 | Roberts ............. G06F 17/30823 235/375 |
| 2013/0188039 A1 | 7/2013 | Mishra et al. |
| 2013/0198859 A1 | 8/2013 | Atkinson et al. |
| 2013/0262336 A1 | 10/2013 | Wan et al. |
| 2013/0320019 A1* | 12/2013 | Tinoco ................ B31D 1/0043 220/359.2 |
| 2014/0014714 A1 | 1/2014 | Tang |
| 2014/0201094 A1 | 7/2014 | Herrington et al. |
| 2014/0324716 A1 | 10/2014 | Florencio et al. |
| 2015/0086756 A1 | 3/2015 | Dubey |
| 2015/0134552 A1 | 5/2015 | Engels et al. |
| 2015/0178521 A1 | 6/2015 | Ching |
| 2016/0027021 A1 | 1/2016 | Kerdemelidis |

OTHER PUBLICATIONS

International Search Report and Written Opinion for PCT/US2015/060842 dated Jan. 27, 2016.

U.S. Appl. No. 14/543,285, filed Nov. 17, 2014, Final Office Action dated Feb. 28, 2018.

U.S. Appl. No. 14/543,285, filed Nov. 17, 2014, Non-Final Office Action dated Oct. 27, 2017.

U.S. Appl. No. 14/543,285, filed Nov. 17, 2014, Response to Non-Final Office Action dated Oct. 27, 2017.

U.S. Appl. No. 14/543,285, filed Nov. 17, 2014, Response to Final Office Action dated Feb. 28, 2018.

U.S. Appl. No. 14/543,285, filed Nov. 17, 2014, Notice of Allowance dated Jun. 7, 2018.

European Patent Application 15801613.9 filed on Nov. 16, 2015, Office Action dated Aug. 1, 2018.

Canadian Office Action for Application No. 2,963,985 dated Mar. 29, 2018.

Canadian Patent Application 2,963,985 filed on Nov. 17, 2014, Office Action dated Jan. 28, 2019.

\* cited by examiner

AUTHENTICITY LABEL FOR ITEMS

BACKGROUND

When purchasing items such as groceries at a grocery store, it may be impossible for a consumer to verify the authenticity of a product. For example, the contents of the packaging may not correspond to what the consumer was expecting. The consumer will typically have no way of verifying the ingredients of the product and its source. Further, the consumer will typically have no knowledge of when the product was manufactured, or of its chain of custody to the store shelves. Likewise, it may be difficult if not impossible for the store to determine which customers have purchased specific defective products in order to perform a recall.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to tracking and verifying authenticity for items. There is an increasing demand by consumers for information about the products that they purchase. The farm-to-table movement, in particular, has raised consumer awareness about the ultimate source of food that they consume. Locally grown food products are becoming more desirable than products sourced from far away, at least for the information provided about product origin. Chickens raised by Joe Smith in the next town may be more desirable than chicken of unknown origin sourced from a multi-national chicken corporation. Further, consumers have become more fickle about how food is grown and livestock are raised. Free-range livestock that are fed natural foods may be more desirable than cage-raised livestock that are fed a processed food. Consumers are also more conscious of organic and environmentally sustainable agriculture, while genetic modifications, herbicides, insecticides, and so on, are perceived negatives. Also, there is a rising awareness of food allergies and sensitivities (e.g., gluten intolerance, lactose intolerance, nut allergies, etc.), making it important for consumers to identify the ingredients used in their food products. Products produced in a non-environmentally sustainable way may be disfavored. Issues relating to consumer preferences apply not only to food items, but to apparel and other categories of items as well.

Consumers may have relied upon representations as to item source, ingredients, and so on that were not tied to specific items. For instance, a food product may be marketed as organic, but there may be no way for consumers to be assured that the specific products they are purchasing have not been adulterated or have an acceptable source. Items are typically marked with universal product codes (UPC), but these identify the item generally, not a specific instance of the item. Even assuming that a specific instance of an item were marked with a unique code, the possibility exists for the code to be moved to different items or be replicated by fraudsters.

Figure 1A:
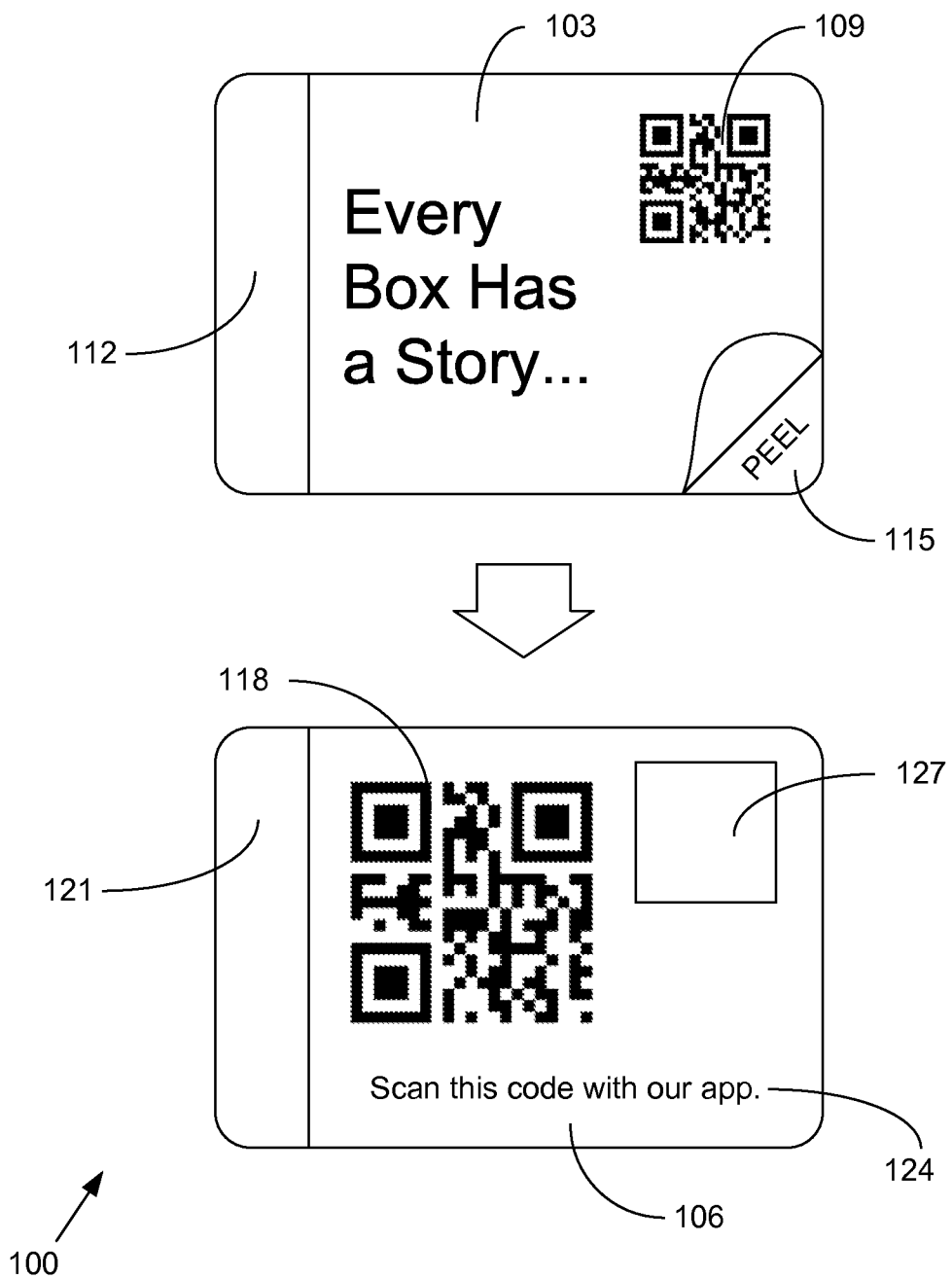
FIG. 1A is a drawing of a multi-layer identifier label according to an embodiment of the present disclosure.
Figure 1B:
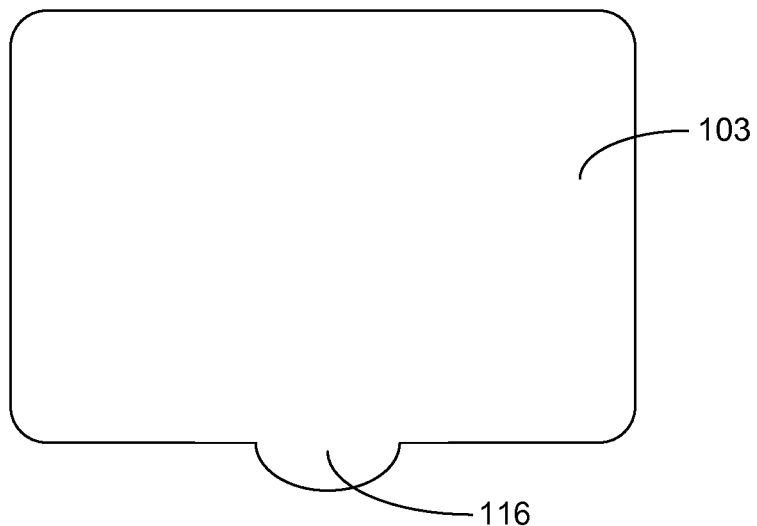
FIG. 1B is a drawing of an upper layer and a lower layer of a multi-layer identifier label according to various embodiments of the present disclosure.
Figure 1B:
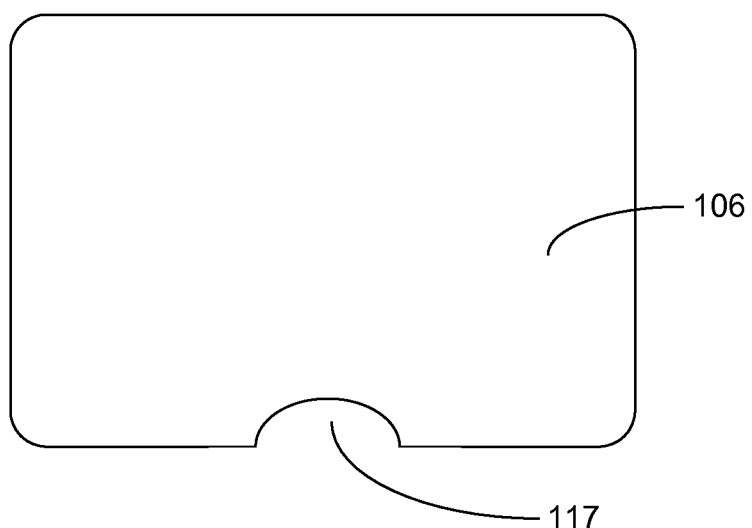
Figure 1C:
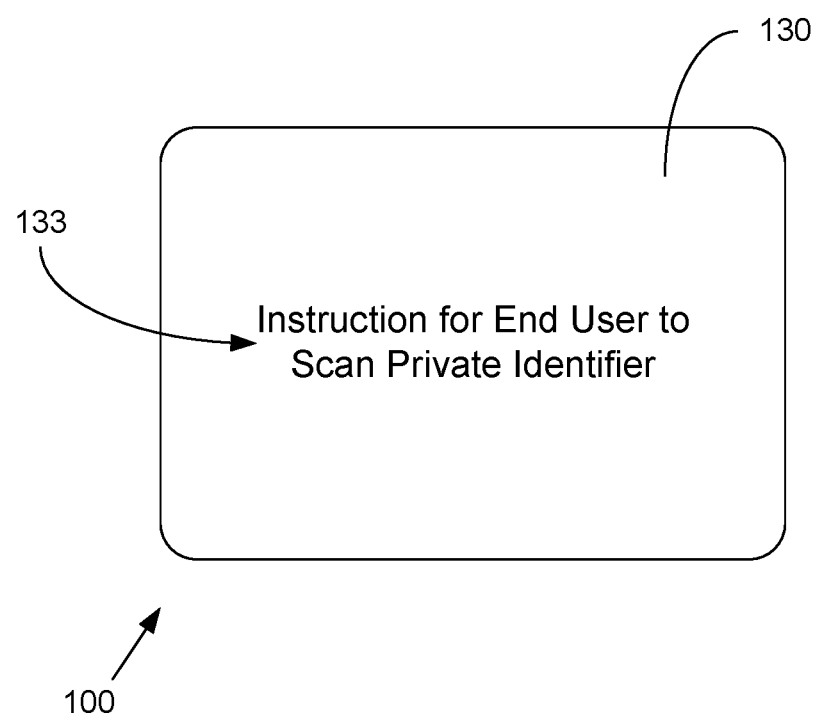
FIG. 1C is a drawing of an underside of the upper layer of a multi-layer identifier label.

FIG. 1C is a drawing of an underside 130 of the upper layer 103 of a multi-layer identifier label 100. In this example, the underside 130 bears an instruction 133 for an end user to scan the private identifier 118.

Various embodiments of the present disclosure facilitate tracking and authenticity verification for an item through the use of a pair of public and private identifiers. Each specific instance of an item (e.g., a single box of cereal) may be associated with a unique public identifier and a unique private identifier contained on a label. The label may, for example, contain multiple layers. In one embodiment, an upper layer bears the public identifier, and a lower layer bears the private identifier. The lower layer may be non-visible unless a tamper-evident action is performed, e.g., the top layer is removed. While the item is being manufactured, warehoused, and transported, only the upper layer bearing the public identifier may be visible. The public identifier may be scanned upon the occurrence of various events, thereby creating a history record uniquely associated to the item.

When an item is shipped to a consumer, the item may be associated with the user account of the consumer. Upon arrival, the consumer may perform the tamper-evident action with respect to the upper layer of the label in order to expose the private identifier on the lower layer of the label. The consumer may scan the private identifier via a client device, or manually enter the private identifier via a web site. The authenticity of the item may be determined, and the authenticity verification and history of the item may be presented to the consumer. This item-level tracking may be used to manage various operational processes for the items as well as to ensure quality and safety. In particular, item-specific expirations may be monitored, and recalls of specific items may be performed.

With reference to FIG. 1A, shown is an example of a multi-layer identifier label 100 according to one embodiment. The multi-layer identifier label 100 here includes an upper layer 103 and a lower layer 106. The upper layer 103 may be opaque and constructed of laminated paper with foil in one embodiment. The lower layer 106 may be constructed of a poly material in one embodiment. The lower layer 106 may be a sticker affixed to an item, while the upper layer 103 may be a sticker affixed to the lower layer 106. The upper layer 103 bears a public identifier 109. The public identifier 109 may comprise a barcode, a two-dimensional barcode (data matrix), quick response (QR) code, an alphanumeric string, or other form of identifier. The upper layer 103 may include a hologram 112. The presence of a hologram 112 may make it more difficult to create a knock-off of the label. The hologram 112 may also serve as a tamper-evident seal to indicate whether the upper layer 103 has been tampered with and/or peeled off.

A peel indicator 115 may be used to indicate to the end user that the upper layer 103 is designed to be peeled off to reveal the lower layer 106. In some embodiments, such as those depicted in FIG. 1B, the upper layer 103 may include a protrusion 116 that extends beyond the edge of the lower layer 106. Also, the lower layer 106 may include a nook 117 that recedes from the edge of the upper layer 103. The protrusion 116 and/or nook 117 may assist the user in removing the upper layer 103 from the lower layer 106.

Returning to FIG. 1A, the lower layer 106 bears a private identifier 118. The private identifier 118 may comprise a barcode, a two-dimensional barcode (data matrix), quick response (QR) code, an alphanumeric string, or other form of identifier. In some embodiments, it may be desirable not to use a QR code in an attempt to prevent users from using non-approved scanning tools that automatically redirect to a uniform resource locator (URL) embedded in the QR code. Because of the design of the multi-layer identifier label 100, the private identifier 118 is non-visible until a tamper-evident action is performed, such as peeling the upper layer 103 off of the lower layer 106. A hologram 121 or other security feature may be present upon the lower layer 106. The lower layer 106 may also contain instructions 124 for the end user. For example, instructions 124 may instruct the user to scan private identifier 118 with a specific application. In one embodiment, additional instructions 124 may be present upon the underside of the upper layer 103.

Peeling the upper layer 103 from the lower layer 106 may be a tamper-evident action. For example, portions of the upper layer 103 may separate, thereby leaving a "void" mark. Also, the upper layer 103 may be removably attached to the lower layer 106 via a clean-release mechanism. For example, after the upper layer 103 is peeled away, the underside of the upper layer 103 as well as the top side of the lower layer 106 may be non-sticky.

The lower layer 106 may have an adhesive backing that is configured to be attached to a product, and removing the lower layer 106 from the product may also be a tamper-evident action. Using a tamper-evident material in the construction of the lower layer 106 may prevent the multi-layer identifier label 100 from being removed from a first product and reaffixed to another product. For example, removing the lower layer 106 may cause portions of the lower layer 106 to separate, thereby leaving a "void" mark. Thus, the tamper-evident material of the lower layer 106 indicates that the multi-layer identifier label 100 has been removed from its original surface.

As a tamper-evident feature, in one embodiment, the public identifier 109 may be printed upon the lower layer 106 in the area 127. The upper layer 103 may contain a transparent window above the area 127 in order for the public identifier 109 to be visible via the upper layer 103 such that the upper layer 103 bears the public identifier 109. In one embodiment, despite being printed upon the lower layer 106, the public identifier 109 may adhere to the upper layer 103 and peel off with the upper layer 103. The area 127 may be specially coated with silicone or another substance such that the ink adheres to the underside of the upper layer 103 and is removed from the lower layer 106. This may simplify printing such that both the public identifier 109 and the private identifier 118 may be printed upon a single layer of the multi-layer identifier label 100. A generic upper layer 103 may then be affixed on top of the specific lower layer 106. In such an embodiment, having the public identifier 109 peel off with or be destroyed by removing the upper layer 103 enables a client device to scan the private identifier 118 without any confusion as to which identifier is to be scanned.

The multi-layer identifier label 100 may also be configured such that the upper layer 103 does not unintentionally peel away from the lower layer 106 due to brushing against equipment or other actions in the supply chain. For example, a glue release element may be disposed between the upper layer 103 and the lower layer 106 at or near the peel indicator 115. Consequently, the upper layer 103 may be easily released only at or near the peel indicator 115. The glue used at other edge areas may prevent unintentional separation from occurring at the other edge areas of the upper layer 103.

In the following discussion, a general description of a system that uses the multi-layer identifier label 100 is provided, followed by a discussion of the operation of the same.

Figure 2:
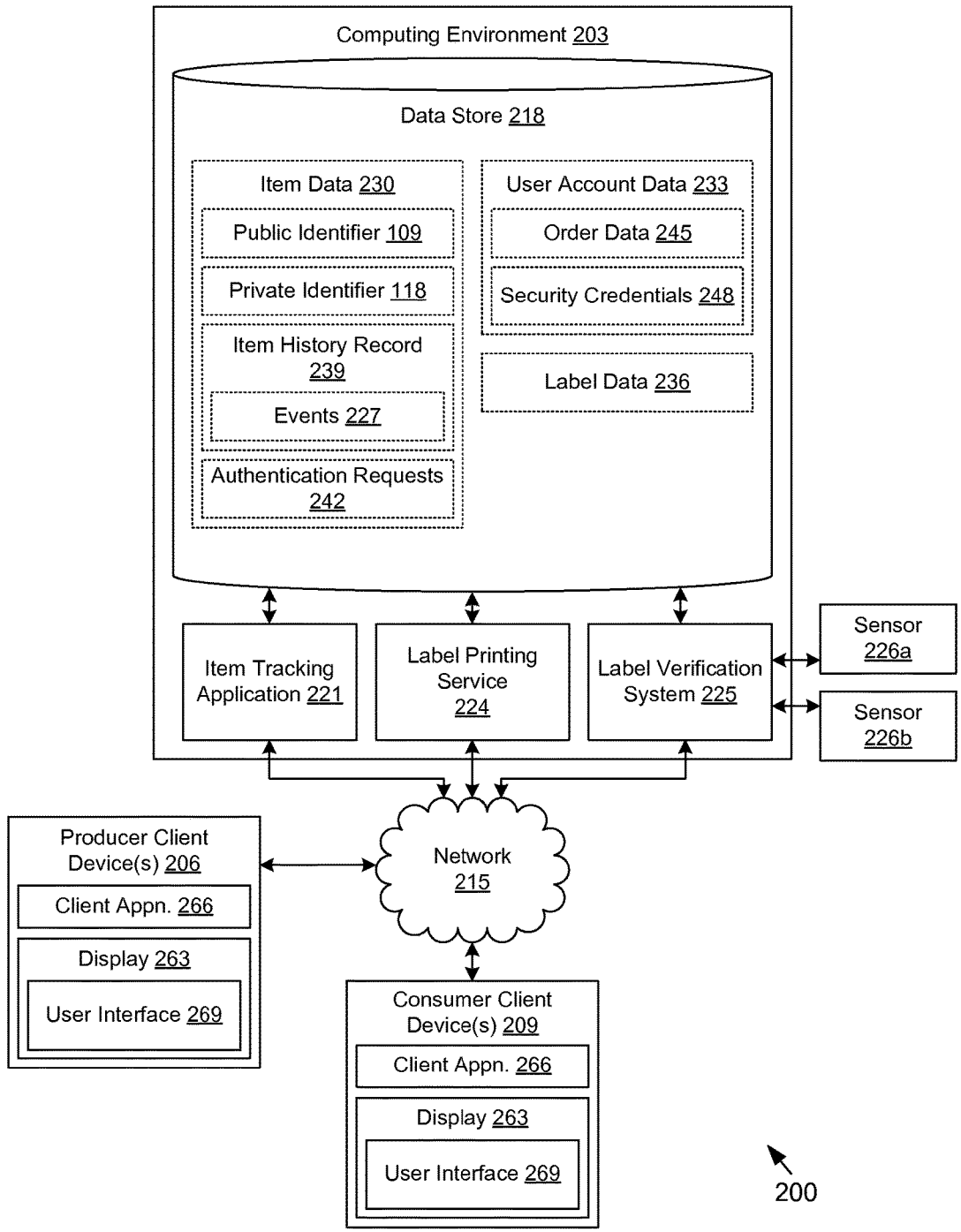
FIG. 2 is a drawing of a networked environment according to various embodiments of the present disclosure.

Moving on to FIG. 2, shown is a networked environment 200 according to various embodiments. The networked environment 200 includes a computing environment 203, one or more producer client devices 206, and one or more consumer client devices 209, which are in data communication with each other via a network 215. The network 215 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 218 that is accessible to the computing environment 203. The data store 218 may be representative of a plurality of data stores 218 as can be appreciated. The data stored in the data store 218, for example, is associated with the operation of the various applications and/or functional entities described below.

The components executed on the computing environment 203, for example, include an item tracking application 221, a label printing service 224, a label verification system 225 in communication with sensors 226a and 226b, and other applications, services, processes, systems, engines, or functionality not discussed in detail herein. The item tracking application 221 is executed to perform item tracking and authenticity verification functions. The various functions performed by the item tracking application 221 may include generating public identifiers 109 and private identifiers 118, recording events 227 relating to item history, and performing verification of authenticity for a given private identifier 118 corresponding to an item. The label printing service 224 is executed to coordinate printing of multi-layer identifier labels 100 (FIG. 1A) and routing of multi-layer identifier labels 100 to various manufacturers and/or distributors of items. The label verification system 225 is configured to verify the correct production of the multi-layer identifier labels 100 via sensors 226a and 226b.

The data stored in the data store 218 includes, for example, item data 230, user account data 233, label data 236, and potentially other data. The item data 230 includes various data corresponding to items offered for sale, lease, rental, or other form of consumption. Such items may comprise products, goods, or other items to which a multi-layer identifier label 100 may be affixed. Each specific instance of an item may be associated with a public identifier 109 and a private identifier 118. The private identifier 118 may be encrypted or otherwise maintained in a secure way. In one embodiment, the private identifier 118 may be encrypted using a reversible form of encryption. In another embodiment, the private identifier 118 may be encrypted using a non-reversible form of encryption (e.g., a hash). It may be that a reversibly encrypted form of the private identifier 118 may be maintained in order to perform rotations of a hashing function used to generate the non-reversibly encrypted form of the private identifier 118.

The item data 230 may include an item history record 239 that records a plurality of events 227 associated with processing of the item. The events 227 may be generated by manufacturers, distributors, shipping carriers, and/or other agents who have produced or transported the corresponding item. Each event 227 may be associated with the item by way of scanning or entering the public identifier 109 in connection with generating the respective event 227. An event 227 may be used to tie specific information to an item, such as manufacturing date, manufacturing location, batch number, list of ingredients, expiration date, harvest date, source country, and so on. The events 227 may also relate to the chain of custody for the item, including describing entities who have had possession of the item and the times they gained or lost custody. This may include manufacturers, distributors, shippers, customers, and so on.

The item data 230 may also record the authentication requests 242 associated with the item. An authentication request 242 may correspond to a specific instance in which a private identifier 118 for an item is presented for authentication of the item. The authentication requests 242 may be recorded for the purpose of limiting the number of authentication requests 242 for the item to a maximum threshold. Although it may be desirable to allow for multiple authentication requests 242 for re-verification and/or verification by subsequent consumers of the item, limiting the total number of authentication requests 242 may ensure that a private identifier 118 is not reused in a fraudulent way.

The user account data 233 may include various data associated with user accounts, such as order data 245, security credentials 248, and/or other data. The order data 245 may record information relating to an order placed by a specific consumer user, including a list of items purchased, scheduled delivery date, whether the item has been delivered, whether the item has been returned, and so on. When an order is fulfilled, the order data 245 may be associated with the specific item sent or to be sent to the consumer. Thus, an individual user account may be associated with the public identifier 109, the private identifier 118, and/or other information in the item data 230. The security credentials 248 may include usernames, passwords, and/or other credentials used in authenticating a user at a consumer client device 209.

The label data 236 includes information about multi-layer identifier labels 100, including those that have not yet been manufactured and those that have been manufactured and have not yet been affixed to items. The label data 236 may indicate the respective public identifier 109 and private identifier 118 of the various labels as well as the current status for each. The label data 236 may identify labels that have been shipped to a manufacturer to be applied to items but are not yet associated with items.

The producer client devices 206 and the consumer client devices 209 are representative of a plurality of client devices that may be coupled to the network 215. Each of the producer client devices 206 and the consumer client devices 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. Each of the producer client devices 206 and the consumer client devices 209 may include a display 263. The display 263 may comprise, for example, one or more devices, such as liquid crystal display (LCD) displays, gas plasma-based flat panel displays, organic light emitting diode (OLED) displays, electrophoretic ink (E ink) displays, LCD projectors, or other types of display devices, etc.

Each of the producer client devices 206 and the consumer client devices 209 may be configured to execute various applications such as a client application 266 and/or other applications. The client application 266 may be executed, for example, to access network content served up by the computing environment 203 and/or other servers, thereby rendering a user interface 269 on the display 263. To this end, the client application 266 may comprise, for example, a browser, a dedicated application, etc., and the user interface 269 may comprise a network page, an application screen, etc. Each of the producer client devices 206 and the consumer client devices 209 may be configured to execute applications beyond the client application 266 such as, for example, email applications, social networking applications, word processors, spreadsheets, and/or other applications.

Next, a general description of the operation of the various components of the networked environment 200 is provided. To begin, the item tracking application 221 creates item data 230, including a public identifier 109 and a private identifier 118. These identifiers are each unique for a particular instance of an item. The item tracking application 221 then initiates the printing of a label corresponding to the item via the label printing service 224.

One example of such a label is shown in FIG. 1A, but this example is not intended to be limiting. Characteristic of the example label is that the public identifier 109 is initially visible, and the private identifier 118 is initially non-visible, where the label is designed so that private identifier 118 is to be accessible only to the end consumer. Tamper-evident features of the label are present so that any attempt to access the private identifier 118 may be seen based on changes to the label.

The printed label is then transferred to a manufacturer or other source of an item. The label may be affixed to the item by that entity. Moreover, the manufacturer or other source may upload detailed information about the item, to include expiration date, a list of ingredients, a source country, and/or other information. This information may be recorded in an event 227 in the item history record 239 of the item data 230.

As the item is received by a fulfillment center or other materials handling facility or shipped from such a facility, the item label may be scanned to obtain the public identifier 109 via the producer client device 206. Events 227 may be created, and the item history record 239 may be updated based upon the time, status, and/or other information relating to the chain of custody for the item. The item may be associated with a specific end user via an order in the order data 245.

The item is delivered to the end user with the label intact. That is to say, the public identifier 109 may be visible and the private identifier 118 may be non-visible. If the private identifier 118 is visible when the item is delivered, the end user may understand that the label has been tampered with. If the label is intact, the end user may perform a tamper-evident action in order to expose the private identifier 118. The end user may then scan the private identifier 118 via the consumer client device 209.

When the private identifier 118 is scanned, the item tracking application 221 may perform various checks to ensure that the item is authentic. The item tracking application 221 may return an indication of whether the item is authentic to the consumer client device 209 for rendering in a user interface 269. Additionally, information from the item history record 239 may be sent to the consumer client device 209 for rendering in a user interface 269.

Figure 3A:
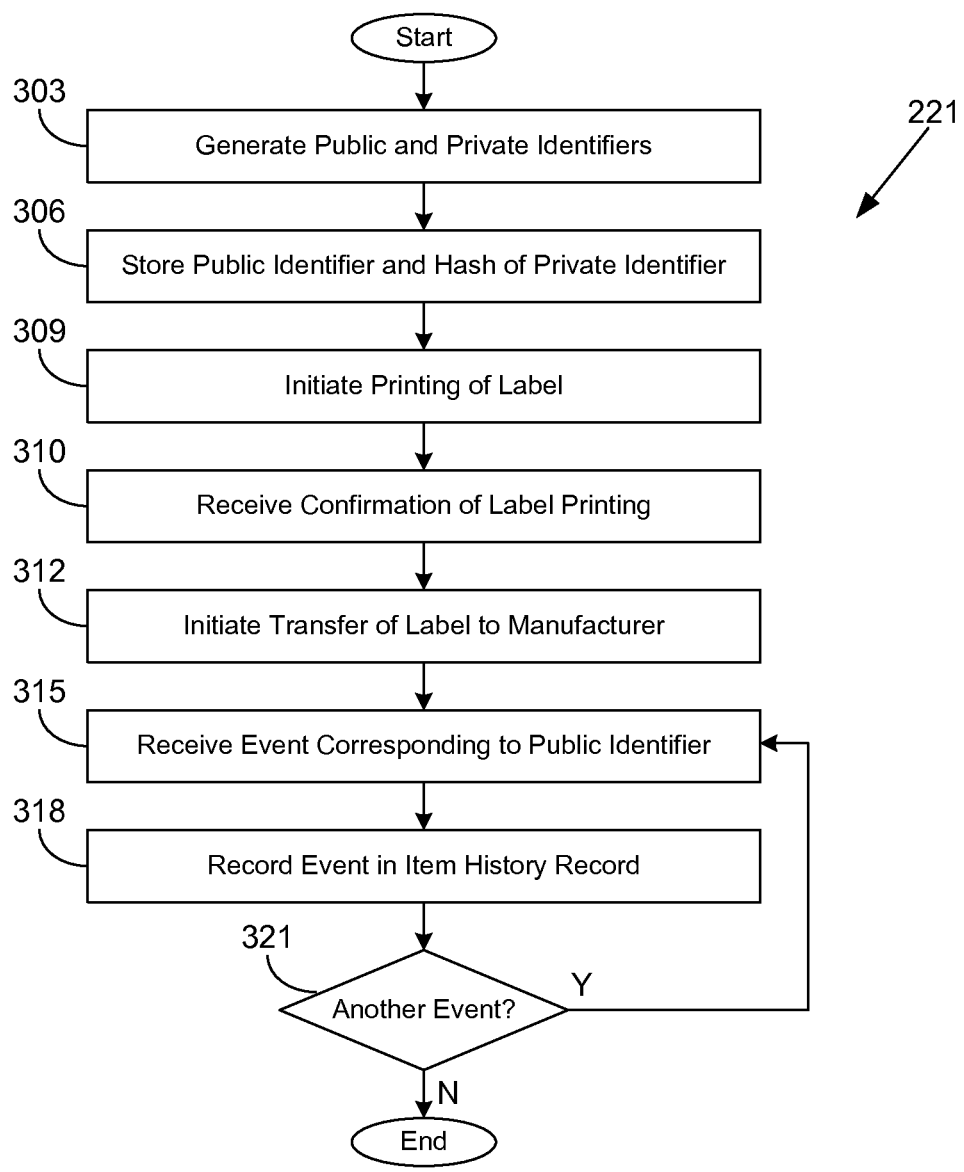
FIGS. 3A and 3B are flowcharts illustrating one example of functionality implemented as portions of an item tracking application executed in a computing environment in the networked environment of FIG. 2 according to various embodiments of the present disclosure.

Referring next to FIG. 3A, shown is a flowchart that provides one example of the operation of a portion of the item tracking application 221 according to various embodiments. It is understood that the flowchart of FIG. 3A provides merely an example of the many different types of functional arrangements that may be employed to implement the operation of the portion of the item tracking application 221 as described herein. As an alternative, the flowchart of FIG. 3A may be viewed as depicting an example of elements of a method implemented in the computing environment 203 (FIG. 2) according to one or more embodiments.

Beginning with box 303, the item tracking application 221 generates a public identifier 109 (FIG. 2) and a private identifier 118 (FIG. 2). In box 306, the item tracking application 221 stores the public identifier 109 and a hashed value of the private identifier 118 in the data store 218 (FIG. 2). In addition, a reversibly encrypted version of the private identifier 118 may also be stored in some embodiments to facilitate recovery and/or rotation of the hashing function.

In box 309, the item tracking application 221 initiates printing of a multi-layer identifier label 100 (FIG. 1A) via the label printing service 224 (FIG. 2). In this regard, the public identifier 109 and the private identifier 118 may be transferred to the label printing service 224. In some cases, the label printing service 224 may be operated by a third-party vendor, and the public identifier 109 and private identifier 118 may be securely transferred to the label printing service 224 via the network 215 (FIG. 2). In box 310, the item tracking application 221 may receive a confirmation from the label printing service 224 that printing has completed.

In box 312, the item tracking application 221 may initiate a transfer of the label to a manufacturer, a vendor, or another party in order for the label to be affixed to an item. In box 315, the item tracking application 221 receives an event 227 (FIG. 2) corresponding to the public identifier 109. The event 227 may be generated by a client application 266 (FIG. 2) executed in a producer client device 206 (FIG. 2), a producer server device, or another device. The label bearing the public identifier 109 may be scanned, and additional information describing the event 227 may be entered manually via a user interface 269 (FIG. 2) or may be supplied automatically via an application programming interface (API). In one embodiment, information about an item (or potentially multiple items) may be uploaded to the item tracking application 221 via a spreadsheet, comma-delimited file, and/or other file.

For example, the event 227 may indicate that the label bearing the public identifier 109 was affixed to a specific item having certain characteristics, that the specific item was received by a distributor, stored in a fulfillment center, picked up by a shipping carrier, shipped to a particular consumer, and so on. The item tracking application 221 may provide an indication of validity to the producer client device 206 from which the public identifier 109 was received. In some scenarios, a trusted entity will refuse to complete an action (e.g., shipping an item, storing an item in a warehouse, fulfilling an order for an item, etc.) unless the item has a valid label affixed to it. In box 318, the item tracking application 221 records the event 227 in the item history record 239 (FIG. 2) in the item data 230 (FIG. 2) for the item.

In box 321, the item tracking application 221 determines whether another event 227 is received. If another event 227 is received, the item tracking application 221 returns to box 315. In this way, the item tracking application 221 may build up an item history record 239 for the item that includes multiple events 227 corresponding to a complete chain of custody for the item. If another event 227 is not received, the portion of the item tracking application 221 ends.

Figure 3B:
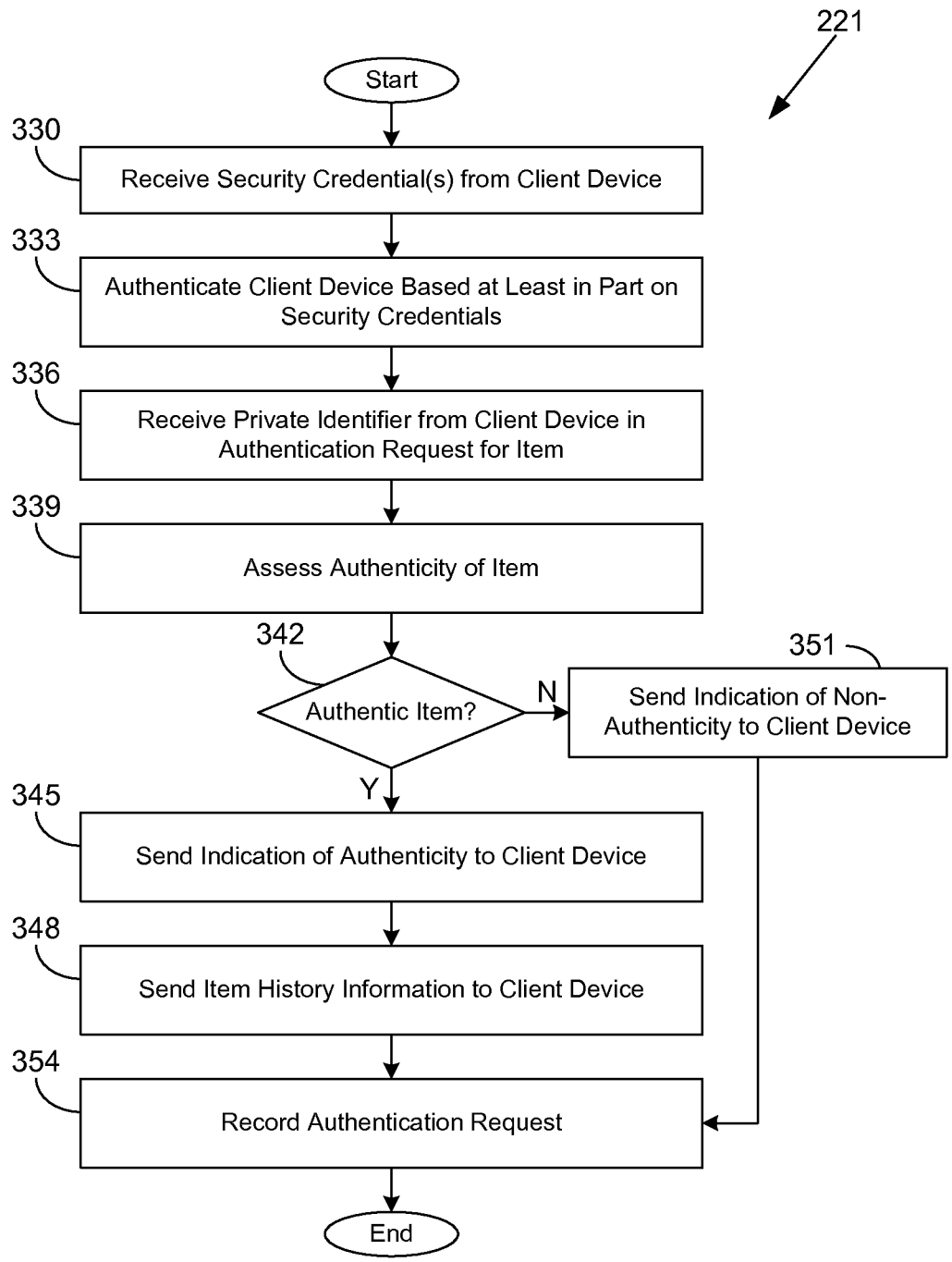

Turning now to FIG. 3B, shown is a flowchart that provides one example of the operation of another portion of the item tracking application 221 according to various embodiments. It is understood that the flowchart of FIG. 3B provides merely an example of the many different types of functional arrangements that may be employed to implement the operation of the portion of the item tracking application 221 as described herein. As an alternative, the flowchart of FIG. 3B may be viewed as depicting an example of elements of a method implemented in the computing environment 203 (FIG. 2) according to one or more embodiments.

Beginning with box 330, the item tracking application 221 receives one or more security credentials 248 (FIG. 2) from a consumer client device 209 (FIG. 2). For example, the security credentials 248 may include a username and a password. In box 333, the item tracking application 221 authenticates the consumer client device 209 based at least in part on the provided security credentials 248. In box 336, the item tracking application 221 receives a private identifier 118 (FIG. 2) from the consumer client device 209 in an authentication request 242 (FIG. 2). For example, a user may use the client application 266 (FIG. 2) to scan a QR code visible on the lower layer 106 (FIG. 1A) of a multi-layer identifier label 100 (FIG. 1A).

In box 339, the item tracking application 221 assesses the authenticity of the item. As an initial matter, the item tracking application 221 may determine that the private identifier 118 is valid and is in fact assigned to an item. The item tracking application 221 may compute a hashed value of the received private identifier 118 and compare that value with a stored hashed value of a private identifier 118. The item tracking application 221 may reconcile the item history record 239 for the assigned item to ensure that there are no irregularities that may be associated with fraud. Based at least in part on the events 227 (FIG. 2) in the item history record 239, the item tracking application 221 is able to determine whether the item is to be considered authentic. In some cases, the authentication request 242 may meet or exceed a maximum threshold for a number of authentication requests 242 for an item, which may call the authenticity of the item into question. In one scenario, an authentication request 242 from a consumer who did not purchase the item may call the authenticity of the item into question.

In box 342, the item tracking application 221 determines whether the item is considered authentic. If so, the item tracking application 221 moves to box 345 and sends an indication of authenticity to the consumer client device 209. The item tracking application 221 then proceeds to box 348. If the item is not determined to be authentic, the item tracking application 221 instead moves from box 342 to box 351. In box 351, the item tracking application 221 sends an indication of non-authenticity to the consumer client device 209. For example, the indication may take the form of a warning message. In some cases, a system administrator or other user may be informed of the irregularity or potential fraud relating to the item and/or the label. The item tracking application 221 then continues to box 354.

In box 348, the item tracking application 221 sends at least a portion of the item history information contained in the item history record 239 to the consumer client device 209. This information may relate to the source, ingredients, chain of custody, and/or other information about the item that may be gleaned from the events 227. Ultimately, the client application 266 may render when and where the item was manufactured, when the item was shipped and where it was shipped from, when and where the item was delivered, and/or other information. In one embodiment, this information may be rendered in a user interface 269 (FIG. 2) including an interactive map.

In box 354, the item tracking application 221 may record information about the authentication request 242. This information may be used in future authentication requests 242 to ensure that a maximum number of authentication requests 242 is not exceeded for the item. Thereafter, the portion of the item tracking application 221 ends.

Figure 3C:
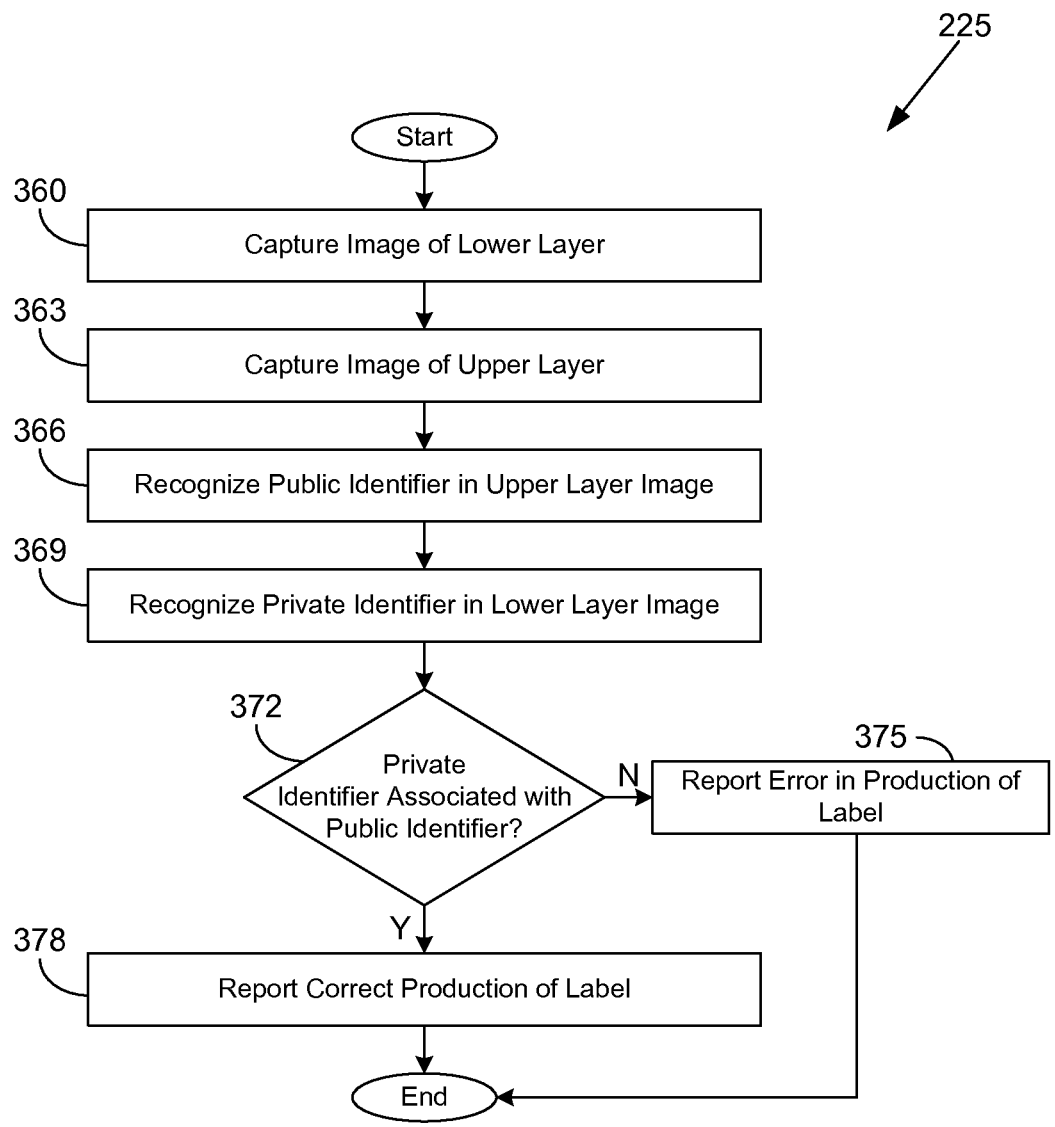
FIG. 3C is a flowchart illustrating one example of functionality implemented as portions of a label verification system executed in a computing environment in the networked environment of FIG. 2 according to various embodiments of the present disclosure.

Moving now to FIG. 3C, shown is a flowchart that provides one example of the operation of a portion of the label verification system 225 according to various embodiments. It is understood that the flowchart of FIG. 3C provides merely an example of the many different types of functional arrangements that may be employed to implement the operation of the portion of the label verification system 225 as described herein. As an alternative, the flowchart of FIG. 3C may be viewed as depicting an example of elements of a method implemented in the computing environment 203 (FIG. 2) according to one or more embodiments.

Beginning with box 360, the label verification system 225 uses the sensor 226a (FIG. 2) to capture an image of the lower layer 106 (FIG. 1) of a multi-layer identifier label 100 (FIG. 1) before the upper layer 103 (FIG. 1) is affixed on top of the lower layer 106 to completely obscure the lower layer 106. In box 363, the label verification system 225 uses the sensor 226b (FIG. 2) to capture an image of the upper layer 103. The image of the upper layer 103 may be captured immediately after the upper layer 103 is affixed on top of the lower layer 106. Likewise, the image of the lower layer 106 may be captured immediately before the upper layer 103 is affixed on top of the lower layer 106.

In box 366, the label verification system 225 recognizes a public identifier 109 (FIG. 1) in the image of the upper layer 103. In doing so, the label verification system 225 may determine whether the public identifier 109 is a valid identifier. In box 369, the label verification system 225 recognizes a private identifier 118 (FIG. 1) in the image of the lower layer 106. In doing so, the label verification system 225 may determine whether the private identifier 118 is a valid identifier. For example, the label verification system 225 may query the item data 230 (FIG. 2) or the item tracking application 221 (FIG. 2) to determine identifier validity. Alternatively, the label verification system 225 may confirm whether the identifiers conform to a predefined format.

In box 372, in order to verify a correct production of the multi-layer identifier label 100, the label verification system 225 determines whether the private identifier 118 is associated with the public identifier 109. For example, the label verification system 225 may query the item data 230 or the item tracking application 221 to determine whether the identifiers are associated with each other. As the private identifier 118 may be stored in the data store 218 as a hashed value, the label verification system 225 or other logic may compute a hashed value of the recognized private identifier 118 in order to compare the hashed value with the stored hashed value.

If the private identifier 118 is not associated with the public identifier 109, or if there is an error in recognizing either of the public identifier 109 or the private identifier 118, the label verification system 225 moves to box 375 and reports an error in the production of the multi-layer identifier label 100. Thereafter, the portion of the label verification system 225 ends.

If, instead, the label verification system 225 verifies the private identifier 118 is associated with the public identifier 109, the label verification system 225 may report a correct production of the multi-layer identifier label 100 in box 378. Thereafter, the portion of the label verification system 225 ends.

Although the flowchart of FIG. 3C relates to the use of multiple sensors 226 to capture multiple images, in some embodiments, the public identifier 109 and the private identifier 118 may both be printed upon the bottom layer 106, and a single sensor 226 may be used to capture a single image. Also, it is noted that the sensors 226 may be used to capture or scan identifiers that are not visibly readable in some embodiments, such as radio-frequency identifiers, magnetic identifiers, etc. Such identifiers may be embedded into product packaging rather than in or on a label.

Figure 4:
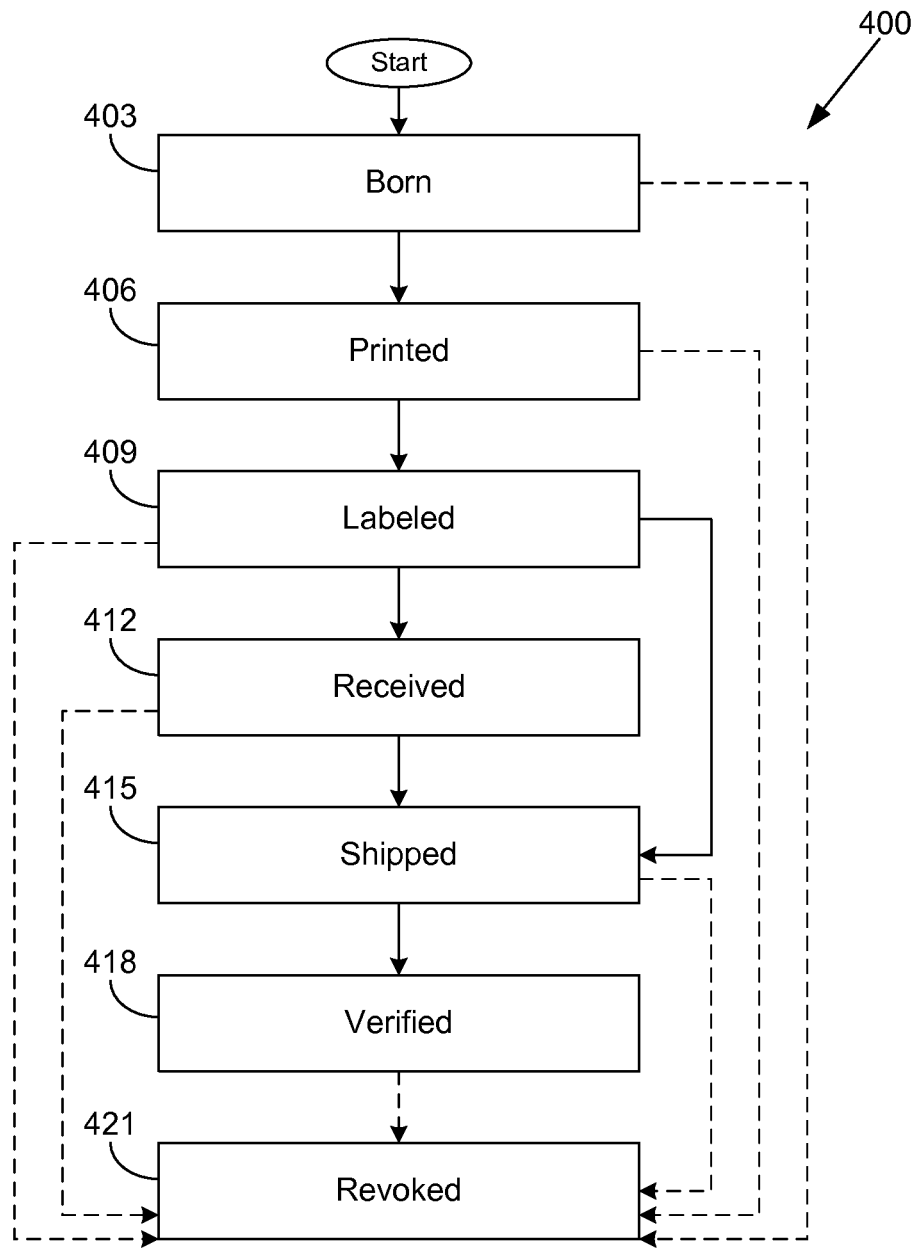
FIG. 4 is a state diagram corresponding to one example of a lifecycle of an item in the networked environment of FIG. 2 according to various embodiments of the present disclosure.

Continuing now to FIG. 4, shown is an example of a state diagram 400 according to one embodiment. The state diagram 400 corresponds to a lifecycle of an item and its associated public identifier 109 (FIG. 2) and private identifier 118 (FIG. 2). Each of the following state transitions may be memorialized by events 227 (FIG. 2) in the item history record 239 (FIG. 2). Beginning with box 403, when the public identifier 109 and the private identifier 118 are first generated, the item is in the "born" or "created" state. Next, in box 406, when the corresponding label is printed, the item is in the "printed" state. This may depend on an acknowledgement from the printer via the label printing service 224 (FIG. 2).

In box 409, when the label has been affixed to the item, the item is in the "labeled" state. In box 412, when the item has been received by a fulfillment center, the item is in the "received" state. In box 415, when the item has been shipped, the item is then in the "shipped" state. In box 418, when the authenticity of the item has been verified by a consumer, the item is in the "verified" state.

In some cases, the item may not be in the "received" state, as the item may be shipped directly by the manufacturer or vendor. Thus, box 409 may instead transition directly to box 415. If various scenarios occur, the item may transition from any other state to box 421 in the "revoked" state. For example, if it is determined that private identifiers 118 have been compromised prior to label printing, the item may transition from "born" to "revoked." Likewise, if labels from the printer are lost, the item may transition from "printed" to "revoked." Similarly, if item that are "labeled," "received," or "shipped" are not accounted for, the item may transition to "revoked." Also, if an item has been verified beyond a maximum threshold of times or beyond a maximum threshold of consumer users, the item may transition from "verified" to "revoked."

Figure 5:
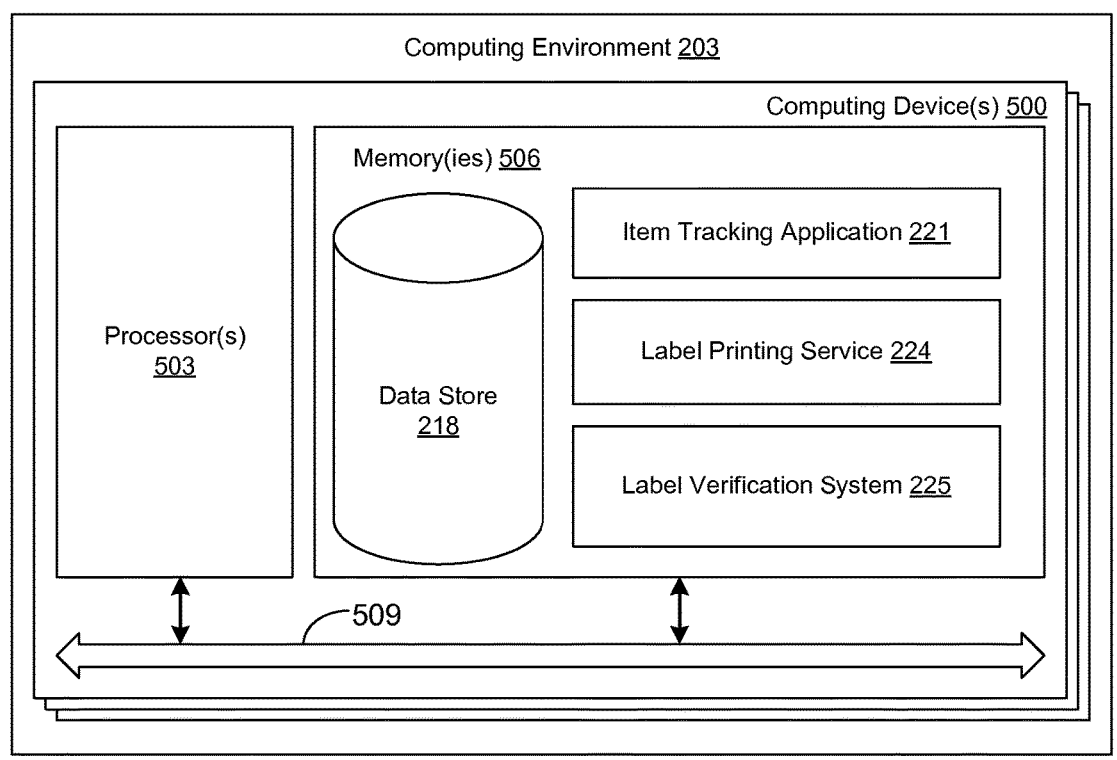
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the item tracking application 221, the label printing service 224, the label verification system 225, and potentially other applications. Also stored in the memory 506 may be a data store 218 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the item tracking application 221, the label printing service 224, the label verification system 225, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-3C show the functionality and operation of an implementation of portions of the item tracking application 221 and the label verification system 225. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A-3C show a specific order of execution, it is understood that the order of execution may differ from that which is depicted. For example, the order of execution of two or more blocks may be scrambled relative to the order shown. Also, two or more blocks shown in succession in FIGS. 3A-3C may be executed concurrently or with partial concurrence. Further, in some embodiments, one or more of the blocks shown in FIGS. 3A-3C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the item tracking application 221, the label printing service 224, and the label verification system 225, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the item tracking application 221, the label printing service 224, and the label verification system 225, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The above comprises at least the following exemplary clauses:

1. A non-transitory computer-readable medium embodying a program executable in at least one computing device, comprising: code that generates a public identifier and a private identifier; code that causes printing of an identifier label to be initiated, the public identifier being initially visible on the identifier label, the private identifier being non-visible unless a tamper-evident action is performed; code that records individual events of a plurality of events in response to individual scans of a plurality of scans of the public identifier; code that receives a scan of the private identifier from a client device; and code that sends authenticity information regarding the identifier label to the client device, the authenticity information being based at least in part on the plurality of events.

2. The non-transitory computer-readable medium of clause 1, wherein one of the plurality of scans indicates at least that the identifier label has been affixed to a product.

3. The non-transitory computer-readable medium of clause 1, wherein one of the plurality of scans indicates at least that a product has been shipped.

4. The non-transitory computer-readable medium of clause 1, wherein the code that sends the authenticity information is configured to send the authenticity information to the client device in response to determining that the private identifier has not been scanned beyond a maximum threshold number of times.

5. The non-transitory computer-readable medium of clause 1, further comprising code that authenticates the client device as being associated with a user account based at least in part on a security credential obtained from the client device.

6. A system, comprising: at least one computing device; and an item tracking application executable in the at least one computing device, the item tracking application comprising: logic that receives an authentication request for an item, the authentication request specifying a private identifier for the item; logic that, in response to receiving the authentication request, determines whether the item is authentic based at least in part on at least one item history event in an item history record, the item history record corresponding to the private identifier, the at least one item history event being recorded in association with a public identifier for the item; and logic that sends information identifying whether the item is authentic to a client device.

7. The system of clause 6, wherein the item tracking application further comprises: logic that determines a number of times that the private identifier has been received; and wherein the logic that sends the information identifying whether the item is authentic is configured to send the information in response to determining that the number of times that the private identifier has been received does not meet a maximum threshold.

8. The system of clause 6, wherein the item tracking application further comprises: logic that receives at least one security credential from the client device; and logic that authenticates the client device as being associated with a user account based at least in part on the at least one security credential prior to receiving the private identifier for the item.

9. The system of clause 6, wherein the item tracking application further comprises: logic that generates a hashed value of the private identifier received from the authentication request; and logic that compares the hashed value with a stored hashed value of the private identifier.

10. The system of clause 6, wherein the item tracking application further comprises: logic that receives an item history event in association with the public identifier; and logic that updates the item history record in response to receiving the item history event in association with the public identifier.

11. The system of clause 6, wherein the logic that receives the authentication request further comprises logic that receives data corresponding to an optical scan by the client device of a private identifier label affixed to the item.

12. The system of clause 6, wherein the item tracking application further comprises logic that sends information corresponding to the at least one item history event to the client device.

13. The system of clause 6, wherein the at least one item history event comprises a plurality of item history events that include at least one of: an item label printed event, an item label revoked event, an item labeled event, an item shipped event, or an item verified event.

14. A method, comprising: generating, by at least one computing device, a public identifier and a private identifier; receiving, by the at least one computing device, the public identifier in association with individual ones of a plurality of events, the individual ones of the plurality of events representing a respective scan of the public identifier affixed to an item, the private identifier being also affixed to the item but not capable of being scanned; and recording, by the at least one computing device, the individual ones of the plurality of events in association with both the public identifier and the private identifier.

15. The method of clause 14, wherein both the public identifier and the private identifier are unique to the item.

16. The method of clause 14, further comprising causing, by the at least one computing device, printing of an identifier label to be initiated, the public identifier being initially visible on the identifier label, the private identifier being initially non-visible on the identifier label.

17. The method of clause 14, further comprising storing, by the at least one computing device, an encrypted version of the private identifier.

18. The method of clause 14, further comprising: determining, by the at least one computing device, that the item has been ordered by a customer; and associating, by the at least one computing device, the public identifier and the private identifier with the customer.

19. The method of clause 14, further comprising: receiving, by the at least one computing device, the private identifier from a client device; and determining, by the at least one computing device, whether the item is authentic based at least in part on the recorded plurality of events; and sending, by the at least one computing device, user interface data indicating whether the item is authentic to the client device.

20. The method of clause 19, further comprising determining, by the at least one computing device, that the private identifier has not been received beyond a maximum threshold number of times.

21. A multi-layer identifier label, comprising: an opaque upper layer bearing a public identifier; a lower layer bearing a private identifier, the upper layer being removably attached to the lower layer, the lower layer being non-visible underneath the opaque upper layer; an adhesive backing below the lower layer that attaches the multi-layer identifier label to a product; wherein the public identifier comprises a first two-dimensional barcode, the private identifier comprises a second two-dimensional barcode, and the first two-dimensional barcode is smaller in size than the second two-dimensional barcode; and wherein peeling away the opaque upper layer to reveal the lower layer is a tamper-evident action.

22. The multi-layer identifier label of clause 21, wherein at least one of the opaque upper layer or the lower layer includes a hologram.

23. The multi-layer identifier label of clause 21, wherein the opaque upper layer bears a visual indication of a location where peeling of the opaque upper layer from the lower layer should be started by a user, wherein a glue release element is disposed at the location between the opaque upper layer and the lower layer.

24. The multi-layer identifier label of clause 21, wherein the opaque upper layer includes a protrusion that extends beyond an edge of the lower layer.

25. The multi-layer identifier label of clause 21, wherein the lower layer includes a nook that recedes from an edge of the opaque upper layer.

26. The multi-layer identifier label of clause 21, wherein an underside of the opaque upper layer bears an instruction for an end user to scan the private identifier.

27. A system, comprising: at least one computing device; and a label verification system executed in the at least one computing device, the label verification system comprising: logic that captures a first image of an upper layer of a multi-layer identifier label; logic that captures a second image of a lower layer of the multi-layer identifier label before the upper layer is affixed on top of the lower layer to completely obscure the lower layer; and logic that verifies a correct production of the multi-layer identifier label based at least in part on the first image and the second image.

28. The system of clause 27, wherein the second image is captured immediately before the upper layer is affixed on top of the lower layer to completely obscure the lower layer.

29. The system of clause 27, wherein the first image is captured immediately after the upper layer is affixed on top of the lower layer to completely obscure the lower layer.

30. The system of clause 27, wherein the label verification system further comprises: logic that determines a first identifier apparent in the first image; logic that determines a second identifier apparent in the second image; and wherein the correct production is verified based at least in part on the first identifier and the second identifier.

31. The system of clause 30, wherein the first identifier is a first two-dimensional barcode, and the second identifier is a second two-dimensional barcode.

32. The system of clause 30, wherein the label verification system further comprises logic that determines whether the first identifier and the second identifiers are valid identifiers.

33. The system of clause 30, wherein the label verification system further comprises logic that determines whether a stored association exists between the first identifier and the second identifier in a data store, wherein the correct production is verified when the stored association exists.

34. The system of clause 33, wherein logic that determines whether the stored association exists further comprises: logic that generates a hashed value of the second identifier; and logic that compares the hashed value with a stored hashed value associated with the first identifier.

35. A multi-layer identifier label, comprising: an upper layer bearing a public identifier; a lower layer bearing a private identifier, the upper layer being removably attached to the lower layer, the lower layer being non-visible underneath the upper layer; an adhesive backing below the lower layer; and wherein peeling away the upper layer to reveal the lower layer is a tamper-evident action.

36. The multi-layer identifier label of clause 35, wherein the public identifier comprises a first two-dimensional barcode, the private identifier comprises a second two-dimensional barcode, and the first two-dimensional barcode is smaller in size than the second two-dimensional barcode.

37. The multi-layer identifier label of clause 36, wherein the second two-dimensional barcode is not a quick response (QR) code.

38. The multi-layer identifier label of clause 35, wherein the upper layer is configured to release cleanly from the lower layer such that an underside of the upper layer is non-sticky when peeled away from the lower layer.

39. The multi-layer identifier label of clause 35, wherein the lower layer is constructed of a tamper-evident material configured to indicate whether the multi-layer identifier label has been affixed to a surface and then removed from the surface.

40. The multi-layer identifier label of clause 35, wherein an underside of the upper layer bears an instruction for an end user to scan the private identifier.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A multi-layer identifier label, comprising:
an opaque upper layer bearing a public identifier;
a lower layer bearing a private identifier, the upper layer being removably attached to the lower layer, the lower layer being non-visible underneath the opaque upper layer;
an adhesive backing below the lower layer that attaches the multi-layer identifier label to a product;
wherein the public identifier comprises a first two-dimensional barcode, the private identifier comprises a second two-dimensional barcode, and the first two-dimensional barcode is smaller in size than the second two-dimensional barcode;
wherein the opaque upper layer bears a visual indication of a location where peeling of the opaque upper layer from the lower layer should be started by a user;
wherein a glue release element is disposed at the location between the opaque upper layer and the lower layer; and
wherein peeling away the opaque upper layer to reveal the lower layer is a tamper-evident action.

2. The multi-layer identifier label of claim 1, wherein at least one of the opaque upper layer or the lower layer includes a hologram.

3. The multi-layer identifier label of claim 1, wherein the opaque upper layer includes a protrusion that extends beyond an edge of the lower layer.

4. The multi-layer identifier label of claim 1, wherein the lower layer includes a nook that recedes from an edge of the opaque upper layer.

5. The multi-layer identifier label of claim 1, wherein an underside of the opaque upper layer bears an instruction for an end user to scan the private identifier.

6. The multi-layer identifier label of claim 1, wherein the opaque upper layer is configured to release cleanly from the lower layer such that an underside of the opaque upper layer is non-sticky when peeled away from the lower layer.

7. A multi-layer identifier label, comprising:
an upper layer bearing a public identifier;
a lower layer bearing a private identifier, the upper layer being removably attached to the lower layer, the lower layer being non-visible underneath the upper layer;
an adhesive backing below the lower layer;
wherein the upper layer is configured to release cleanly from the lower layer such that an underside of the upper layer is non-sticky when peeled away from the lower layer; and
wherein peeling away the upper layer to reveal the lower layer is a tamper-evident action.

8. The multi-layer identifier label of claim 7, wherein the public identifier comprises a first two-dimensional barcode, the private identifier comprises a second two-dimensional barcode, and the first two-dimensional barcode is smaller in size than the second two-dimensional barcode.

9. The multi-layer identifier label of claim 8, wherein the second two-dimensional barcode is not a quick response (QR) code.

10. The multi-layer identifier label of claim 7, wherein the lower layer is constructed of a tamper-evident material configured to indicate whether the multi-layer identifier label has been affixed to a surface and then removed from the surface.

11. The multi-layer identifier label of claim 7, wherein an underside of the upper layer bears an instruction for an end user to scan the private identifier.

12. The multi-layer identifier label of claim 7, wherein the lower layer includes a nook that recedes from an edge of the upper layer.

13. The multi-layer identifier label of claim 7, wherein the upper layer bears a visual indication of a location where peeling of the upper layer from the lower layer should be started by a user.

14. The multi-layer identifier label of claim 13, wherein a glue release element is disposed at the location between the upper layer and the lower layer.

15. A multi-layer identifier label, comprising:
an opaque upper layer bearing a public identifier;
a lower layer bearing a private identifier, the upper layer being removably attached to the lower layer, the lower layer being non-visible underneath the opaque upper layer;
an adhesive backing below the lower layer that attaches the multi-layer identifier label to a product;
wherein the public identifier comprises a first two-dimensional barcode, the private identifier comprises a second two-dimensional barcode, and the first two-dimensional barcode is smaller in size than the second two-dimensional barcode;
wherein the lower layer includes a nook that recedes from an edge of the opaque upper layer; and
wherein peeling away the opaque upper layer to reveal the lower layer is a tamper-evident action.

16. The multi-layer identifier label of claim 15, wherein at least one of the opaque upper layer or the lower layer includes a hologram.

17. The multi-layer identifier label of claim 15, wherein the opaque upper layer includes a protrusion that extends beyond an edge of the lower layer.

18. The multi-layer identifier label of claim 15, wherein an underside of the opaque upper layer bears an instruction for an end user to scan the private identifier.

19. The multi-layer identifier label of claim 15, wherein the opaque upper layer bears a visual indication of a location where peeling of the opaque upper layer from the lower layer should be started by a user.

20. The multi-layer identifier label of claim 19, wherein a glue release element is disposed at the location between the opaque upper layer and the lower layer.

* * * * *